(12) United States Patent
Lamba et al.

(10) Patent No.: US 9,256,593 B2
(45) Date of Patent: Feb. 9, 2016

(54) IDENTIFYING PRODUCT REFERENCES IN USER-GENERATED CONTENT

(71) Applicant: Wal-Mart Stores, Inc., Bentonville, AR (US)

(72) Inventors: Digvijay Singh Lamba, Sunnyvale, CA (US); Xiaoyong Chai, Mountain View, CA (US); Nicole Whisler, San Jose, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 203 days.

(21) Appl. No.: 13/688,060

(22) Filed: Nov. 28, 2012

(65) Prior Publication Data

US 2014/0149105 A1 May 29, 2014

(51) Int. Cl.
*G06F 17/27* (2006.01)

(52) U.S. Cl.
CPC .......... *G06F 17/2765* (2013.01); *G06F 17/277* (2013.01)

(58) Field of Classification Search
CPC ..... G06F 17/30008; G06F 9/526; G06F 9/52; G06F 9/466; G06F 17/30067
USPC ........................................................ 707/704
See application file for complete search history.

(56) References Cited

U.S. PATENT DOCUMENTS

| | | | |
|---|---|---|---|
| 5,659,731 A | 8/1997 | Gustafson | |
| 6,256,633 B1 | 7/2001 | Dharap | |
| 6,377,945 B1 | 4/2002 | Risvik | |
| 7,219,105 B2 | 5/2007 | Kummamuru | |
| 7,844,646 B1* | 11/2010 | Deshmukh et al. | 707/825 |
| 7,949,716 B2 | 5/2011 | Alperovitch | |
| 8,117,199 B2 | 2/2012 | Ghani | |
| 8,478,589 B2 | 7/2013 | Begeja | |
| 8,515,828 B1* | 8/2013 | Wolf et al. | 705/26.7 |
| 2003/0050915 A1* | 3/2003 | Allemang et al. | 707/1 |
| 2006/0129446 A1* | 6/2006 | Ruhl et al. | 705/10 |
| 2007/0005593 A1 | 1/2007 | Self | |
| 2007/0073734 A1* | 3/2007 | Doan et al. | 707/100 |
| 2007/0276858 A1* | 11/2007 | Cushman et al. | 707/102 |
| 2008/0114710 A1* | 5/2008 | Pucher | G06N 99/005 706/20 |
| 2008/0177691 A1* | 7/2008 | Alperovitch et al. | 706/48 |
| 2009/0077027 A1* | 3/2009 | King et al. | 707/3 |

(Continued)

OTHER PUBLICATIONS

Ghani et al. (Recommender Systems and Product Semantics, Workshop on Recommendation & Personalization in E-Commerce, Accenture, May 28, 2002).*

*Primary Examiner* — Jason Liao
*Assistant Examiner* — Lin Lin Htay
(74) *Attorney, Agent, or Firm* — Bryan Cave LLP (57) ABSTRACT

Systems and methods are disclosed herein for extracting products referenced in a document. A document is analyzed to identify a product type that is referenced in the document. Attributes are extracted from the document. A set of candidate products are identified corresponding to the extracted attributes. A score is calculated for the candidate products and the products are further selected or filtered based on the score, whitelist rules, and blacklist rules in order to identify one or more inferred products referenced by the document. The whitelist and blacklist rules may take as inputs a domain, a user identifier, and keywords included in the document. A set of sufficient attributes may be identified for each product type. Selection of a candidate product may be based at least in part on the document including all of the attributes in the set of sufficient attributes.

14 Claims, 4 Drawing Sheets

(56) References Cited

U.S. PATENT DOCUMENTS

| | | | |
|---|---|---|---|
| 2009/0106298 A1* | 4/2009 | Furusho | 707/102 |
| 2011/0179047 A1* | 7/2011 | Zhang et al. | 707/754 |
| 2012/0131139 A1 | 5/2012 | Siripurapu | |
| 2013/0290110 A1* | 10/2013 | LuVogt et al. | 705/14.66 |

* cited by examiner

IDENTIFYING PRODUCT REFERENCES IN USER-GENERATED CONTENT

BACKGROUND

1. Field of the Invention

This invention relates to systems and methods for identifying products referenced in user generated content such as comments and social media postings.

2. Background of the Invention

Many forums exist for users to post content. For example, there are many social media sites that allow users to post their experiences. Many manufacturers and merchants also provide interfaces for consumers to rate or review products. Consumer protection groups and sites dedicated to a particular class of products (e.g. automobiles) also enable consumers to post reviews of products.

In many situations it can be difficult to determine the product that is discussed in a post. For example, a product may be referenced with a colloquial term that is not known to a search engine or other analytic software. In addition, in many situations the name of a product may be known from context such that a posting itself does not indicate the product being discussed. For example, in postings that form a conversation an initial posting may reference the product but subsequent postings do not. In another example, a user may make a post referencing purchase or ownership of a product on a social media site. Subsequent posts may contain valuable content describing the user's opinions of a product but omit an explicit reference to the product.

The methods and systems described herein provide a novel approach to extracting product entities from user-generated content.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 1:
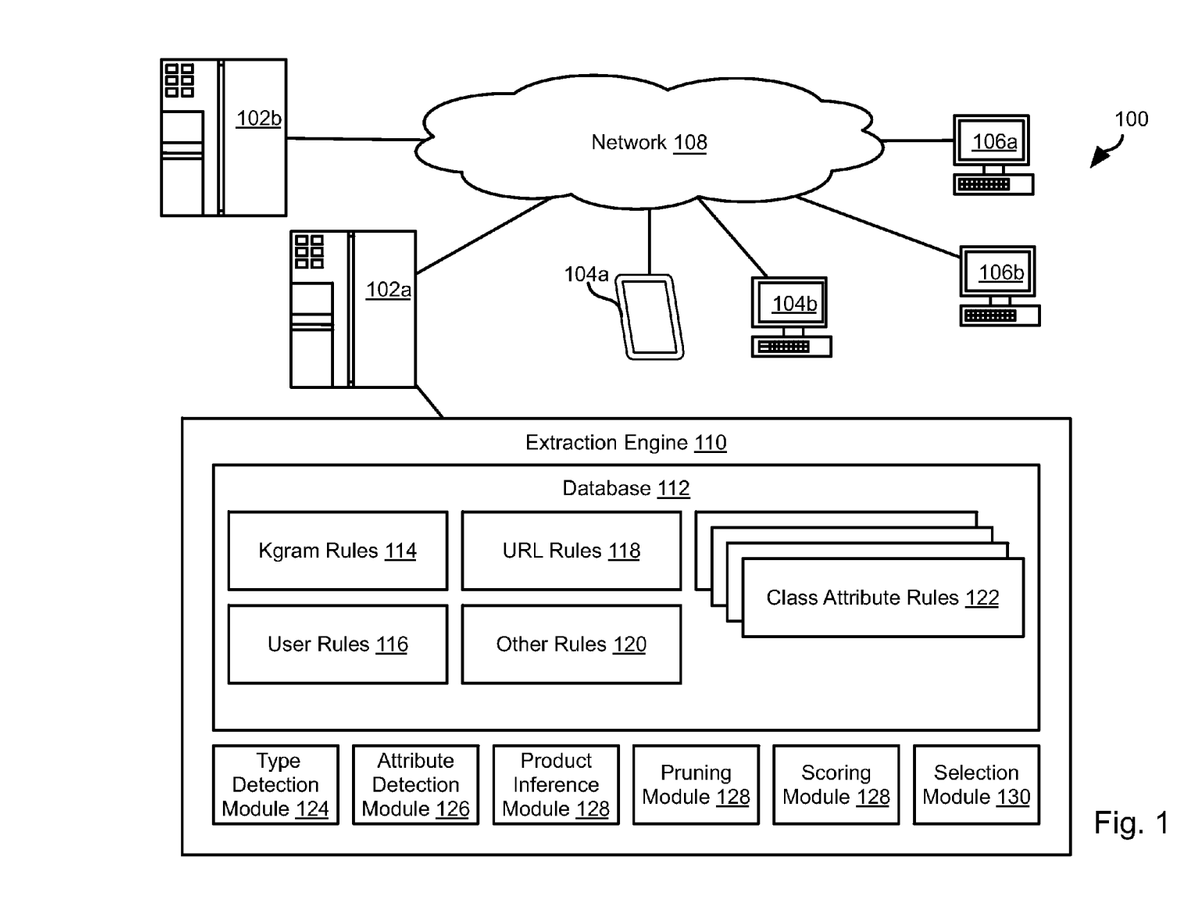
FIG. 1 is a schematic block diagram of a system for methods in accordance with embodiments of the present invention.

FIG. 1 illustrates a system 100 in which methods described hereinbelow may be implemented. The system 100 may include one or more server systems 102a, 102b that may each be embodied as one or more server computers each including one or more processors that are in data communication with one another. The server systems 102a, 102b may be in data communication with one or more user computers 104a, 104b and one or more crowdsourcing workstations 106a, 106b. In the methods disclosed herein, the user computers 104a, 104b and crowdsourcing workstations 106a, 106b may be embodied as mobile devices such as a mobile phone or tablet computer.

In some embodiments, some or all of the methods disclosed herein may be performed using a desktop computer or any other computing device as the user computers 104a, 104b or crowdsourcing workstations 106a, 106b. For purposes of this disclosure, discussion of communication with a user or entity or activity performed by the user or entity may be interpreted as communication with a computer 104a, 104b associated with the user or entity or activity taking place on a computer associated with the user or entity.

Some or all of the server 102, user devices 104a, 104b, and crowdsourcing workstations 106a, 106b may communicate with one another by means of a network 108. The network 108 may be embodied as a peer-to-peer wireless connection between devices, a connection through a local area network (LAN), WiFi network, the Internet, or any other communication medium or system.

The server system 102a may be associated with a merchant, or other entity, performing product extraction analysis described herein. For example, the server system 102a may host a search engine or a site hosted by a merchant to provide access to information about products and user opinions about products. The server system 102b may implement a social networking site that enables the generation of content by a user. For example, the server system 102b may store, provide access to, or enable generation of, social media content for a site such as Facebook™, Twitter™, FourSquare™, LinedIn™, or other social networking or blogging site that enables the posting of content by users. In particular, the server system 102b may provide a site dedicated to a specific class of products such as automobiles and that is operable to receive user reviews of such products.

A server system 102a may host an extraction engine 110. The extraction engine 110 may host or access a database 112 storing data suitable for use in accordance with the methods disclosed herein. For example, the database 112 may store kgram rules 114, user rules 116, URL rules 118, and other rules 120. The rules 114-120 may specify rules to augment or override determinations of inferred products in accordance to methods disclosed herein.

For example, the rules 114-120 may specify an action to be performed based on the satisfaction of a condition. The action taken may include whitelisting or blacklisting of a product. For example, a blacklist rule may specify that where the condition of the rule is satisfied certain products should be excluded from consideration. In another example, a whitelist kgram rule may specify that where the condition of the rule is satisfied, a product should be selected as the inferred product for a document regardless of other determinations in accordance with methods described herein. Other actions taken as a result of a rule, such as augmenting or decrementing a score associated with a candidate product, where the score is used to select an inferred product from among the candidate products as described hereinbelow.

The rules may be input by an analyst or may be automatically generated. For example, documents of a training set of documents may each be mapped to one or more products by analysts. The training set and product mappings may be used to train a machine learning algorithm. The machine learning algorithm may generate rules as a result of training using the training set. Where a rule identifies a very strong correspondence between an attribute of a document and a product, either positive or negative, a rule may be generated that will result in a corresponding blacklist or whitelist rule that imposes the rule. Where a strong positive correspondence is found, a whitelist rule may be generated. Where a strong negative correspondence is found, a blacklist rule may be generated. A strong correspondence may be one where, for example, over 99%, or even 100%, of documents that satisfy the rule either do or do not correspond to a product. In some embodiment, rules 114-120 may be generated in response to documents that are not properly associated with products according to a machine learning algorithm. For example, where a machine learning algorithm consistently fails to produce the correct result for a document in the training set, an analyst may be prompted to generate a special rule for that document. An analyst may also be responsible for identifying inaccurately categorized documents or documents for which no product could be identified.

A kgram rule 114 may specify as a condition the occurrence of a collection of keywords, the co-occurrence of keywords, the co-occurrence of some keywords and the non-inclusion of others, and any other textual pattern that can be described as known in the art, such as by using regular expressions.

A user rule 116 may specify as a condition an author of a document, or the mention of a user in a document. A URL rule 118 may specify as a condition a source web domain, source area of a domain, or specific URL. Other rules 120 may specify as a condition for application any other attribute of a document or aspect of the origin of a document.

The database 112 may include class attribute rules 122. For different types of products, different attributes need to be identified in order to determine with confidence whether a product is mentioned. Accordingly class attribute rules 122 may specify a sufficient set of attributes. The sufficient set of attributes may not necessarily specify values for a particular attribute. For example, an attribute in the sufficient set may specify "color" as an attribute without specifying a specific color (red, blue, etc.).

The extraction engine 110 may include one or more of a type detection module 124, attribute detection module 126, product inference module 128, pruning module 128, scoring module 128, and a selection module 130. A type detection module 124 analyzes a document and selects a product type that can be associated with confidence with the document. The type detection module 124 identifies the lowest node in a taxonomy that can be unambiguously associated with the document. Any classification method known in the art to identify a product type. For example, type detection may use methods disclosed in U.S. patent application Ser. No. 13/300,524, entitled "PROCESSING DATA FEEDS," filed Nov. 18, 2011, which is hereby incorporated herein by reference in its entirety.

In some embodiments, the identification of product types is performed using a suffix-tree-like data structure that includes a dictionary of product type names, synonyms thereof, and other kgrams for identifying a product type. As known in the art a suffix-tree-like data structure provides for fast searching and accordingly allows quick identification of a product type from a document based on mentions of a product type or synonyms thereof and the occurrence of one or more associated kgrams. The suffix-tree-like data structure may be trained according to a machine learning algorithm with the training set being documents and product types associated with the documents by analysts. The machine learning algorithm may additionally or alternatively be trained by a corpus, such as a product taxonomy that associates products with a node of a taxonomy or as a descendent of a node of a taxonomy.

The attribute detection module 126 identifies one or more attributes referenced in the document. The attributes extracted may include, for example an <attribute:value> pair including both an attribute identified and the value for that attribute. In some embodiments or instances, only a value may be extracted as representative of an attribute for some attributes. As for the product type extraction, identifying an attribute may be accomplished by means of a suffix-tree-like data structure that indexes possible attribute values for a product taxonomy that facilitates rapid identification of one or both of attributes and attribute values in a document.

The product inference module 128 identifies candidate products based on an identified product type and the attributes extracted. Identifying candidate products may include comparing the extracted attributes to known attributes of products belonging to the identified product type. Those that include some or all of the extracted attributes may be identified as candidate products. In some instances, a document may reference multiple products such that a product need not have all the extracted attributes to be referenced by the document. Accordingly, candidate products may be those that are of the identified product type and include N of the extracted attributes, e.g. one, two, or more.

A pruning module 128 removes candidate products based on one or more criteria. For example, the pruning module 128 may apply one or more of the rules 114-120 to remove candidate products. For example, an applicable blacklist rule may result in removal of certain product candidates where the condition of the rule is met.

A scoring module 128 assigns a score to the candidate products. For example, scores may be assigned to candidate products in accordance with the class attribute rules 122. For example, a candidate product may have a confidence score augmented if a sufficient set of attributes specified in a class attribute rule 122 corresponding to the product or the identified product is found in the document. Other signals and properties of a document may be used to assign a score to a candidate product. Examples of how these scores may be assigned are described in greater detail below. A selection module 130 evaluates one or more of the document, extracted attributes, candidate products, candidate product scores, and other information in order to select one or more products as a product that is likely identified in a document.

Figure 2:
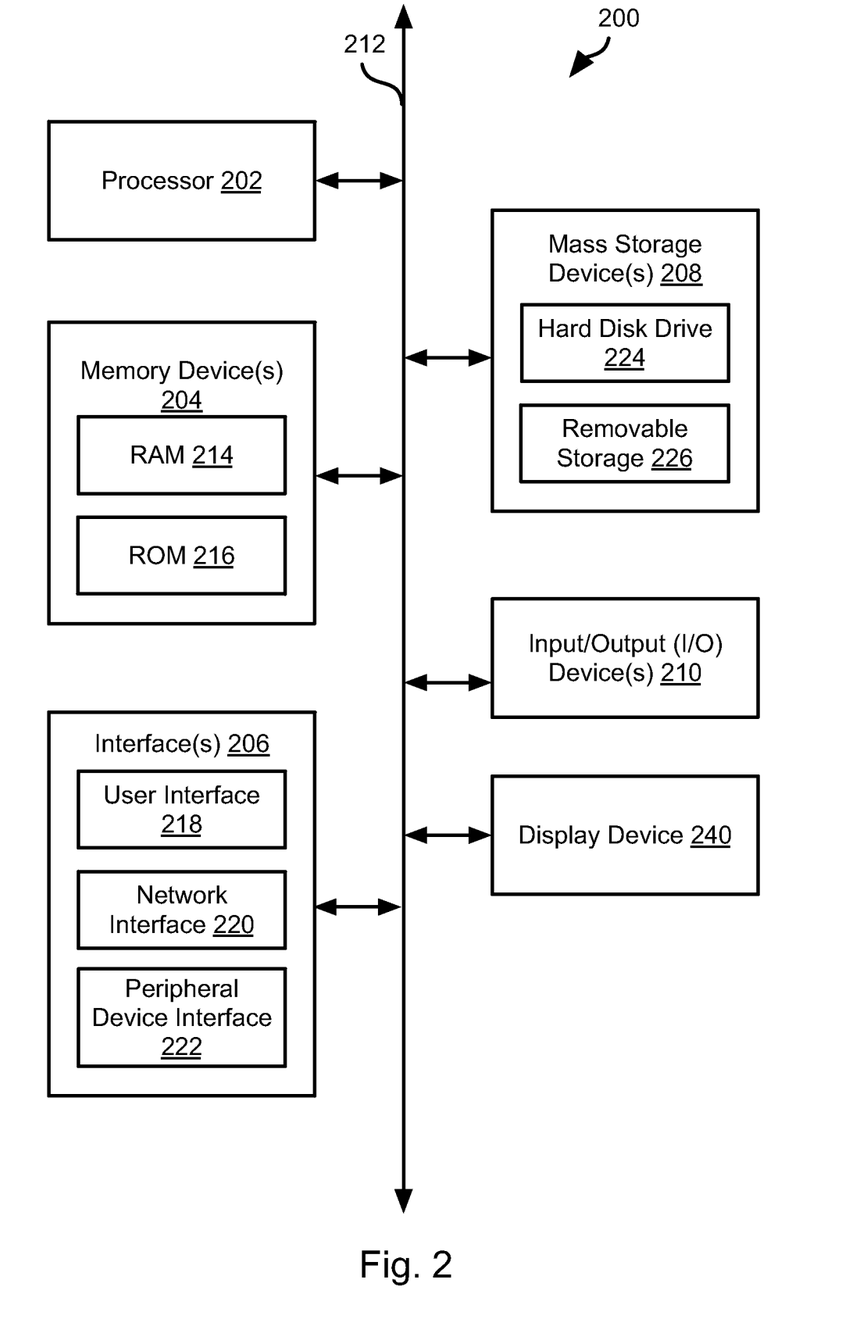
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102a, 102b, user computer 104a, 104b, and crowdsourcing workstation 106a, 106b may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
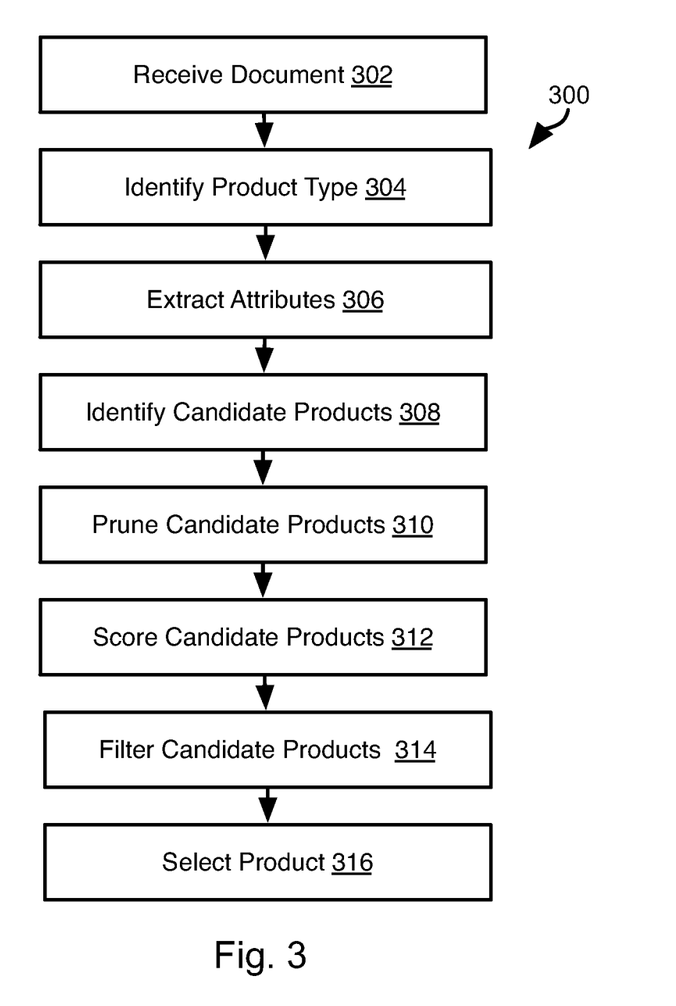
FIG. 3 is a process flow diagram of a method for associating a product with a document in accordance with an embodiment of the present invention.

FIG. 3 illustrates a method 300 for associating a product with a document. The method 300 may include receiving 302 a document. The document may then be evaluated to identify 304 a product type. As noted above, a suffix-tree-like data structure may associate product types with synonyms and other kgrams and enable rapid comparison of text of a document to kgrams associated with a product type. The attributes referenced by a document may then be extracted 306. Attribute values may likewise be stored in a suffix-tree-like data structure to enable the rapid identification of one or both of attributes and attribute values. The suffix-tree like data structure may be generated by means of a machine learning algorithm. For example, the suffix-tree may be generated according to training by means of a machine learning algorithm using as a training set textual patterns and attributes to which they correspond as specified by an analyst or a reference corpus. A reference corpus may be a product catalog that specifies lists of attributes and potential values for attributes for various products. For purpose of this disclosure an attribute may be a feature, product name, performance metric, product category, a product to be used in combination with a product, a product or material consumed by a product, or the like.

The method 300 may further include identifying 308 candidate products. Identifying 308 candidate products may include identifying products that are both a product of the identified 304 product type and possess one or more of the extracted attributes. Identifying 308 a candidate product may include identifying a category or subcategory of products as well as actual products. For example, a candidate product may include a brand as well as specific products marketed under that brand. Identifying 308 a candidate product may include identifying a product that is capable of possessing one or more attributes of the extracted attributes as well as having values of the one or more attributes identified in the document. As noted above, in some embodiments a sufficient set of attributes may be identified for a product of a certain type. In some embodiments, candidate products are those for which all attributes and corresponding values of the sufficient set of attributes corresponding to the identified product type are found in the document. In other embodiments, evaluation of candidate product's attributes with respect to the sufficient set of attributes is performed at a subsequent step.

The candidate products may then be pruned 310. Pruning 310 may include applying one or more rules. For example, one or more rules 114-120 may be applied. As already noted the rules 114-120 may be whitelist rules or blacklist rules that take action based on satisfaction of one or more conditions by a document. If the condition of a whitelist rule is satisfied, a product may be promoted among the candidate lists, such as by removing all products that are not specified by the whitelist rule. Following pruning, in some instances, only products that satisfy at least one whitelist may remain as candidate products. Where a blacklist rule applies, products specified by the blacklist may be removed from among the candidate products as part of pruning 310. In some embodiments, pruning 310 candidate products may also include evaluating one or more class attribute rules 122 corresponding to an identified product type for the document. For example, those candidate products for which attributes and corresponding attribute values belonging to a sufficient attribute set for the product type have not been extracted from a document may be pruned 310.

The candidate products may be scored 312. Scoring 312 may include assigning a score to a candidate product according an analysis of the document. An example of a method for assigning a score to a candidate product is described below with respect to FIG. 5.

The method 300 may include filtering 314 candidate products. Those products that remain after pruning may be subject to an additional pruning step. For example, in one embodiment pruning may include applying a domain constraint. This may include restricting the candidate products to those that belong to a common product domains. For example, where candidate products that remain after preceding steps belong to different product domains products belonging to all but one of the different product domains may be removed. Each domain may be a branch of a taxonomy. For example, a lowest common node of a taxonomy including all candidate products remaining at the filtering step 314 may be identified. Each descendent node of this node that includes a candidate product may be identified as a product domain.

The product domain that is retained may be selected by various means. For example, the domain including the largest number of remaining candidate products may be selected. Alternatively, the product domain for which an average score or aggregate score for products in the domain is highest may be selected as the product domain retained. Alternatively, the product domain that includes the product with the highest score may be retained. A product from the candidate products remaining after any of the preceding steps may then be selected 316. This may include selecting all products having a score above a threshold or a single product or products with the highest score.

Figure 4:
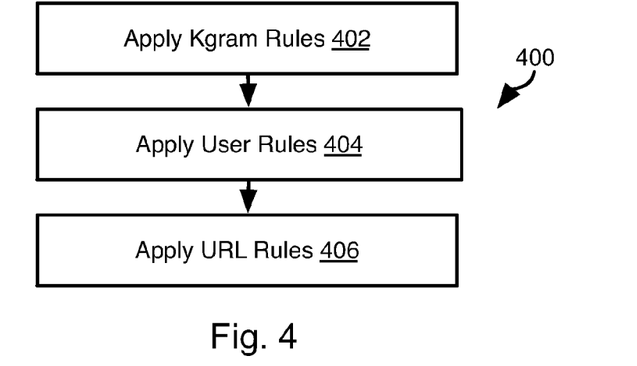
FIG. 4 is a process flow diagram of a method for applying rules to a document in accordance with an embodiment of the present invention.

FIG. 4 illustrates a method 400 for applying rules. The method 400 may include applying 402 a kgram rule. A kgram rule may specify as a condition the occurrence of a textual pattern in a document. A kgram rule may also take as an input or part of a condition for a rule an attribute or attribute value that has been extracted from a document. A textual pattern may be expressed as a word, list of words, regular expression, a co-occurrence of words, a proximity of patterns or words to one another in a document. An action specified to be taken by a kgram rule may be executed as a part of applying 402 a kgram rule if a condition specified by the rule is met. An action may include, a whitelist action that excludes all but a product or products specified by the rule as a candidate product or the final selection of a product for a document. An action may include a blacklist action that excludes one or more products from a set of candidate products. An action may include incrementing or decrementing a score associated with one or more products or otherwise assigning a score to one or more candidate products.

The method 400 may include applying 404 user rules. A user rule may specify as a condition a user identifier. The condition of a rule may additionally specify that the user identifier occur in the text of a document or be the author of a document. The user identifier may be associated with a user of a social media site, a contributor to a website or forum, a blogger, a user that posts a comment to a site of a merchant or retailer, or the like. A user rule may enable the recognition of authoritative users and an area of expertise of the user. A user rule may also enable the exclusion of user's known to be "spammers." For example, a user rule may specify that where a user is identified in accordance with the rule, products not belonging to a particular category or class should be excluded (e.g. a blacklist rule) or that products belonging to a particular category or class should be included as a candidate product (e.g. a whitelist rule). Any other action discussed herein may be taken as a result of association of a document with a user in a given manner. Applying 404 a user rule may include taking the action specified by the rule with respect to one or more candidate products, including removing products, adding products, or any other action specified according to the rule.

The method 400 may include applying 406 one or more URL rules. A URL rule may specify as a condition a web domain, a section of a web domain, a specific web page under a web domain, or any other attribute of a web domain. The URL rule may specify that a URL be the location at which a document being analyzed is located or that the URL be referenced by a document. An action taken when a specified condition is met may include any of the actions described herein with respect the other types of rules.

Figure 5:
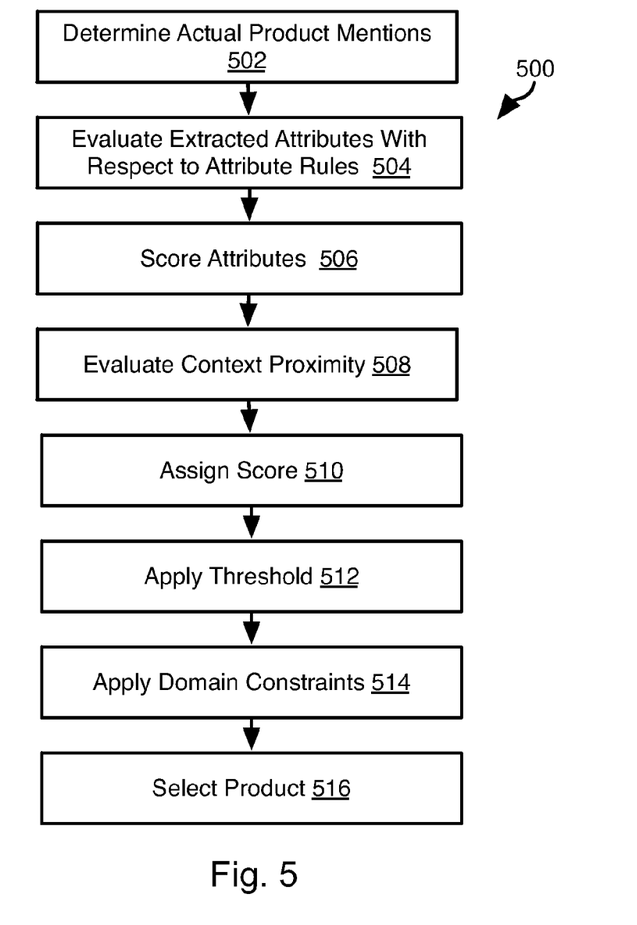
FIG. 5 is a process flow diagram of a method for scoring a candidate product in accordance with an embodiment of the present invention.

FIG. 5 illustrates a method 500 for evaluating candidate products as identified according to the methods described hereinabove. The method 500 may presume that a set of candidate products has already been identified. The method 500 described herein specified various evaluations to be performed. As a result of some or all of these a score associated with a candidate product may be augmented or otherwise adjusted or calculated as a result of the evaluation.

The method 500 may include determining 502 actual mentions of a candidate product in a document. Determining actual mentions may include identifying synonyms or unambiguous colloquial names for a product in a document. A score may be associated with each occurrence of a product name for a candidate product. For example, the score may increase for each mention. The amount by which a score is incremented for a product mention may vary based on the type of mention, e.g. use of a canonical name versus a colloquial name.

The method 500 may include evaluating 504 extracted attributes with respect to attribute rules. This may include comparing extracted attributes identified in a document to a rule specifying a sufficient set of attributes for a product type identified for the document. Where one or both of the attributes and attribute values in a document corresponding thereto correspond to the attributes of a candidate product, a score for a candidate product may be augmented in accordance with the extent to which the matching attributes and attribute values correspond to the sufficient set of attributes. For example, where attributes and attribute values for a candidate product are found for all of the sufficient set of attributes, the score for the candidate product may be augmented. In some embodiments, where less than all of the attributes of the sufficient set are found a score may be augmented in accordance with the number of attributes found. In some embodiments, the score for a candidate product may also be augmented in accordance with correspondence between identified attribute values in a document and the attributes of a candidate product in addition to those of the sufficient attribute set.

The method 500 may additionally include scoring 506 the attribute values found for a candidate product. Some attribute values may be more indicative of a product reference than others. Accordingly, a score for a candidate product may be adjusted in accordance to whether matching attribute values have certain properties. For example, a score for a product may be augmented where an identified matching value includes one or more digits, a value is capitalized, or some other property of the textual representation of an attribute value.

The method 500 may include evaluating 508 context proximity of the candidate products with respect to a context of a document. A product may have one or more canonical articles associated therewith, such as a description of the product in a reference corpus or a product catalog. This canonical article may be characterized in order to determine contextual words, phrases, or other textual patterns, in the canonical article. The context of a product may also reference other articles in a taxonomy, for example, the classes, categories, and/or products proximate a product in a taxonomy may also be part of the context of a product.

The contextual words and other textual patterns for a candidate product may be compared to the context of a document. The context of a document may include words, frequency of usage of words, textual patterns, co-occurrence of words, proximity of words to one another, or any other characteristic of a document. Evaluating 508 context proximity may include comparing the context of a candidate product to the context of a document. The score of a candidate product may be augmented in proportion to similarity of these contexts and/or decremented in proportion to a dissimilarity of these contexts.

Using a combination, e.g. a sum or weighted sum, of scores as calculated according to some or all of the foregoing steps, a score may be assigned 510 to candidate products. A threshold may be applied 512. Applying a threshold may include removing those product candidates having scores below the threshold. A different value of the threshold may be used for documents associated with different product types or candidate products belonging to particular classes or categories. The candidate products may also be filtered 514 according to domain constraints as described above with respect to the method 300. A candidate product may be selected 516 according to the foregoing steps. This may include selecting all remaining candidate products that have not been removed according to a preceding step. Selecting 516 a candidate product may include selecting the candidate product having the highest scores or the top N candidate products with scores above the threshold.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for product extraction, the method comprising:
receiving, by a computer system, a document;
identifying, by the computer system, a product type for the document according to content of the document;
extracting, by the computer system, product attributes and attribute values from the document;
retrieving, by the computer system, an attribute set corresponding to the product type from a database;
identifying, by the computer system, a first set of products that have at least the product attributes and the attribute values of the document that are included in the attribute set, the first set of products being nodes in a hierarchical taxonomy;
filtering, by the computer system, the first set of products by:
identifying a common ancestor node in the hierarchical taxonomy having all of the first set of products as descendants;
identifying immediate child nodes of the common ancestor node;
identifying a majority child node having a major portion of the first set of products as descendants; and
identifying a second set of products including a portion of the first set of products that are descendants of the majority child node and excluding those products of the first set of products that are not descendants of the majority child node;
selecting, by the computer system, an inferred product for the document from the second set of products; wherein:
identifying the second set of products comprises:
calculating a score for each product in the first set of products; and
selecting the second set of products based at least in part on the calculated scores for the first set of products;
selecting the second set of products comprises:
removing products from the first set of products if application of a blacklist rule to the document so indicates; and selecting the inferred product comprises:
selecting the inferred product as specified by a whitelist rule if application of the whitelist rule to the document so indicates; and
at least one of the blacklist rule and the whitelist rule take as an input a list of keywords from the document.

2. The method of claim 1, wherein at least one of the blacklist rule and the whitelist rule take as the input an author of the document.

3. The method of claim 1, wherein at least one of the blacklist rule and the whitelist rule take as the input a web domain of the document.

4. The method of claim 1, wherein at least one of the blacklist rule and the whitelist rule take as the input a Uniform Resource Locator ("URL") for the document.

5. The method of claim 1, wherein calculating the score for each product of the first set of products further comprises calculating the score based on at least one of:
a proximity of context of the document to a context associated with the each product;
a similarity of attributes of the each product and the product attributes;
textual properties of the product attributes; and
a number of actual mentions of the each product and any synonyms thereof in the document.

6. The method of claim 5, wherein the textual properties of the product attributes include a user of capitalization and a presence of digits in the product attributes.

7. The method of claim 1, wherein identifying the second set of products based at least in part on the calculated scores for the first set of products further comprises:
removing products from the first set of products based on a comparison of the calculated scores thereof to a threshold;
wherein selecting the inferred product from the second set of products comprises identify a highest scoring product of the second set of products.

8. A system comprising:
one or more processors, the one or more processors embodied as one or more processing devices; and
one or more non-transitory storage modules storing executable and operational data effective to cause the one or more processors to:
receive a document;
identify a product type for the document according to content of the document;
extract product attributes and attribute values from the document;
retrieve an attribute set corresponding to the product type from a database;
identify a first set of products that have at least the product attributes and the attribute values of the document that are included in the attribute set, the first set of products being nodes in a hierarchical taxonomy;
filter the first set of products by:
identifying a common ancestor node in the hierarchical taxonomy having all of the first set of products as descendants;
identifying immediate child nodes of the common ancestor node;
identifying a majority child node having a major portion of the first set of products as descendants; and
identifying a second set of products including a portion of the first set of products that are descendants of the majority child node and excluding those products of the first set of products that are not descendants of the majority child node;
select an inferred product for the document from the second set of products; wherein:
the executable and operational data are further effective to cause the one or more processors to identify the second set of products by:
calculating a score for each product in the first set of products; and
selecting the second set of products based at least in part on the calculated scores for the first set of products;
the executable and operational data are further effective to cause the one or more processors to select the second set of products by:
removing products from the first set of products if application of a blacklist rule to the document so indicates; and
wherein selecting the inferred product comprises selecting the inferred product as specified by a whitelist rule if application of the whitelist rule to the document so indicates; and
at least one of the blacklist rule and the whitelist rule take as an input a list of keywords from the document.

9. The system of claim 8, wherein at least one of the blacklist rule and the whitelist rule take as the input an author of the document.

10. The system of claim 8, wherein at least one of the blacklist rule and the whitelist rule take as the input a web domain associated with the document.

11. The system of claim 8, wherein at least one of the blacklist rule and the whitelist rule take as the input a Uniform Resource Locator ("URL") for the document.

12. The system of claim 8, wherein the executable and operational data are further effective to cause the one or more processors to calculate the score for each product of the first set of products by calculating the score based on at least one of:
   a proximity of context of the document to a context associated with the each product;
   a similarity of attributes of the each product and the product attributes;
   textual properties of the product attributes; and
   a number of actual mentions of the each product and any synonyms thereof in the document.

13. The system of claim 12, wherein the textual properties of the product attributes include a user of capitalization and a presence of digits in the product attributes.

14. The system of claim 8, wherein the executable and operational data are further effective to cause the one or more processors to identify the second set of products by:
   removing products from the first set of products based on a comparison of the calculated scores thereof to a threshold;
   wherein selecting the inferred product from the second set of products comprises identify a highest scoring product of the second set of products.

* * * * *